May 18, 1954     R. T. SHEEN     2,678,541
FEEDING LIQUID CHLORINE

Filed Jan. 28, 1949     5 Sheets—Sheet 1

INVENTOR
Robert T. Sheen.
BY
ATTORNEYS

May 18, 1954 R. T. SHEEN 2,678,541
FEEDING LIQUID CHLORINE
Filed Jan. 28, 1949 5 Sheets-Sheet 5

INVENTOR
Robert T. Sheen
BY
ATTORNEYS

Patented May 18, 1954

2,678,541

UNITED STATES PATENT OFFICE 2,678,541

FEEDING LIQUID CHLORINE

Robert T. Sheen, Wyndmoor, Pa., assignor to Milton Roy Company, Chestnut Hill, Philadelphia, Pa.

Application January 28, 1949, Serial No. 73,377

3 Claims. (Cl. 62—1)

The present invention relates to the feeding of chlorine.

A purpose of the invention is to increase greatly the accuracy of feeding chlorine.

A further purpose is to meter and feed chlorine more safely, using equipment which is sturdier and less likely to fail and which requires less maintenance.

A further purpose is to avoid errors in feeding chlorine due to changes in temperature.

A further purpose is to permit feeding of relatively minute quantities of chlorine with improved accuracy.

A further purpose is to improve the automatic feeding of chlorine in accordance with chlorine demand.

A further purpose is to meter and pump chlorine as a liquid at a pressure above the vapor pressure of the chlorine at the particular temperature and subsequently to reduce the pressure, as through a pressure reducing valve or regulating or relief valve before dispensing the chlorine.

Further purposes appear in the specification and in the claims.

In the drawings I have chosen to illustrate one only of the numerous embodiments in which my invention may appear, the forms shown being chosen from the standpoints of convenience in illustration, satisfactory operation and clear demonstration of the principles involved.

Figure 4 is a diagrammatic axial section through an individual pump.

Figure 5 is a section on the line 5—5 of Figure 4.

Figure 1:
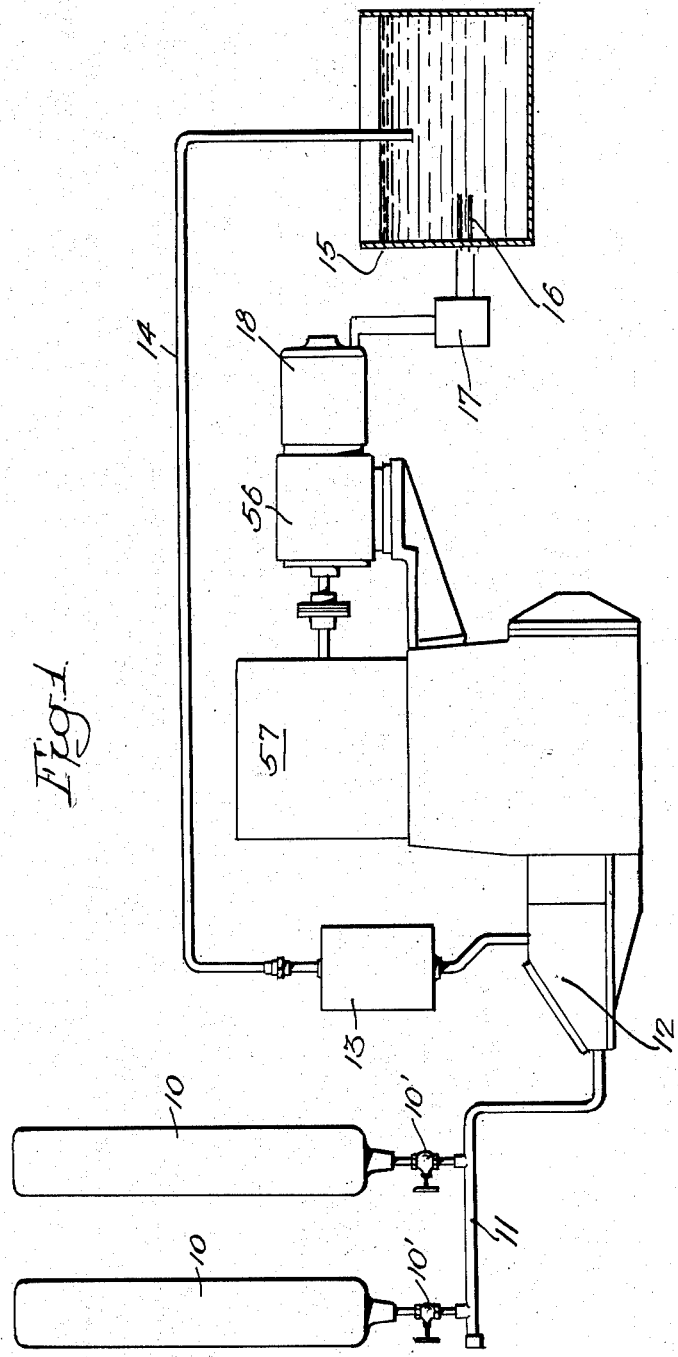
Figure 1 is a diagrammatic view partly in section illustrating the invention.

Describing in illustration but not in limitation and referring to the drawings:

In the prior practice of feeding chlorine, the chlorine is ordinarily expanded from the liquid in the cylinder into a gas and measured and dispensed as a gas. Being a gas, it responds to the gas laws at the time of measurement, and error is introduced in the measurement by change in temperature. Even aside from change in temperature, the measurement of gases is generally highly inaccurate, and accordingly the results obtained vary widely under different operating conditions. Furthermore the volumes which must be handled and measured are considerable, and the apparatus is correspondingly bulky. The corrosion problem in handling chlorine is serious, especially as moisture may unintentionally be present, and great difficulty has been encountered in the design of suitable metering apparatus.

In accordance with the invention very high precision is obtained in feeding chlorine. This is particularly useful when feeding at very low rates. The apparatus required in accordance with the invention is fundamentally quite simple and sturdy, so that the danger to the user through possible failure is much reduced, and the difficulty through interruption of service in connection with maintenance is decreased.

In accordance with the invention, the chlorine, instead of first being converted to gas and then metered, is pumped and metered as liquid at a pressure above the vapor pressure at the particular temperature, and is subsequently expanded and dispensed after expanding.

Referring first to Figure 1, a plurality of high pressure storage cylinders 10 having liquid chlorine therein are provided. The cylinders are tilted or inverted as shown so that the discharge valves 10' are at the bottom, and any gas in the cylinders will rise to the top. Accordingly a stream of liquid chlorine is available under pressure through the valves 10'. The valves are suitably connected to a pipe 11 which is attached at the inlet end of a metering pump 12, later described in detail. From the discharge side of the metering pump 12, the liquid chlorine passes to a pressure reducing valve 13 which will suitably be a pressure regulator valve or relief valve. On the opposite side of the pressure reducing valve 13, the chlorine enters a dispenser 14, suitably a pipe, which discharges into the material to which the chlorine is to be added, contained in a suitable container 15.

It will be evident that in the chlorine cylinders, in the pipe 11 and in the pump the chlorine is under a pressure in excess of the vapor pressure of the chlorine at the particular temperature. This pressure will normally be in excess of 130 pounds per square inch at room temperature and will suitably be of the order of 300 pounds per square inch. On the dispenser side of the expansion valve 13, however, the chlorine is under a pressure below the vapor pressure of chlorine at the particular temperature, and where the chlorine leaves the dispenser the pressure will normally be substantially atmospheric pressure. Therefore the chlorine will be converted to gas and be dispensed as gas, but the measuring will be accomplished on liquid chlorine. Therefore variations in temperature or variations in atmospheric pressure will have very little effect on the quantity dispensed. In this respect the device and process of this invention is quite different from the prior art.

The particular material to which the chlorine is added will of course vary with the service to which the invention is applied. In water treatment the material will be water, whereas in bleaching or shrinkproofing it will normally be a water bath. In chemical reactions the material may be a solution to be chlorinated or oxidized. It will be understood that any other suitable material may be present in the container 15.

No effort has been made to describe in detail the special alloys or other materials which may be used to resist the attack of chlorine, and it will be understood that the parts will be made of any suitable chlorine resisting material as well known in the art.

In many cases it will be desirable to provide automatic control of the pump 12. To suggest this, a sensing element 16 is shown in contact with the material in the container 15, and connected through the container to a terminal box 17. The sensing element may be of any suitable character which indicates chlorine demand, and may in effect measure conductivity, oxidation potential, flow or any other feature indicating chlorine demand. The sensing element shown is of the type which will indicate oxidation potential as well known. The junction box 17 is connected by suitable wiring to a chlorine controller 18 which is of well known character, and which starts and stops the pump as chlorine demand arises and ceases.

Figure 2:
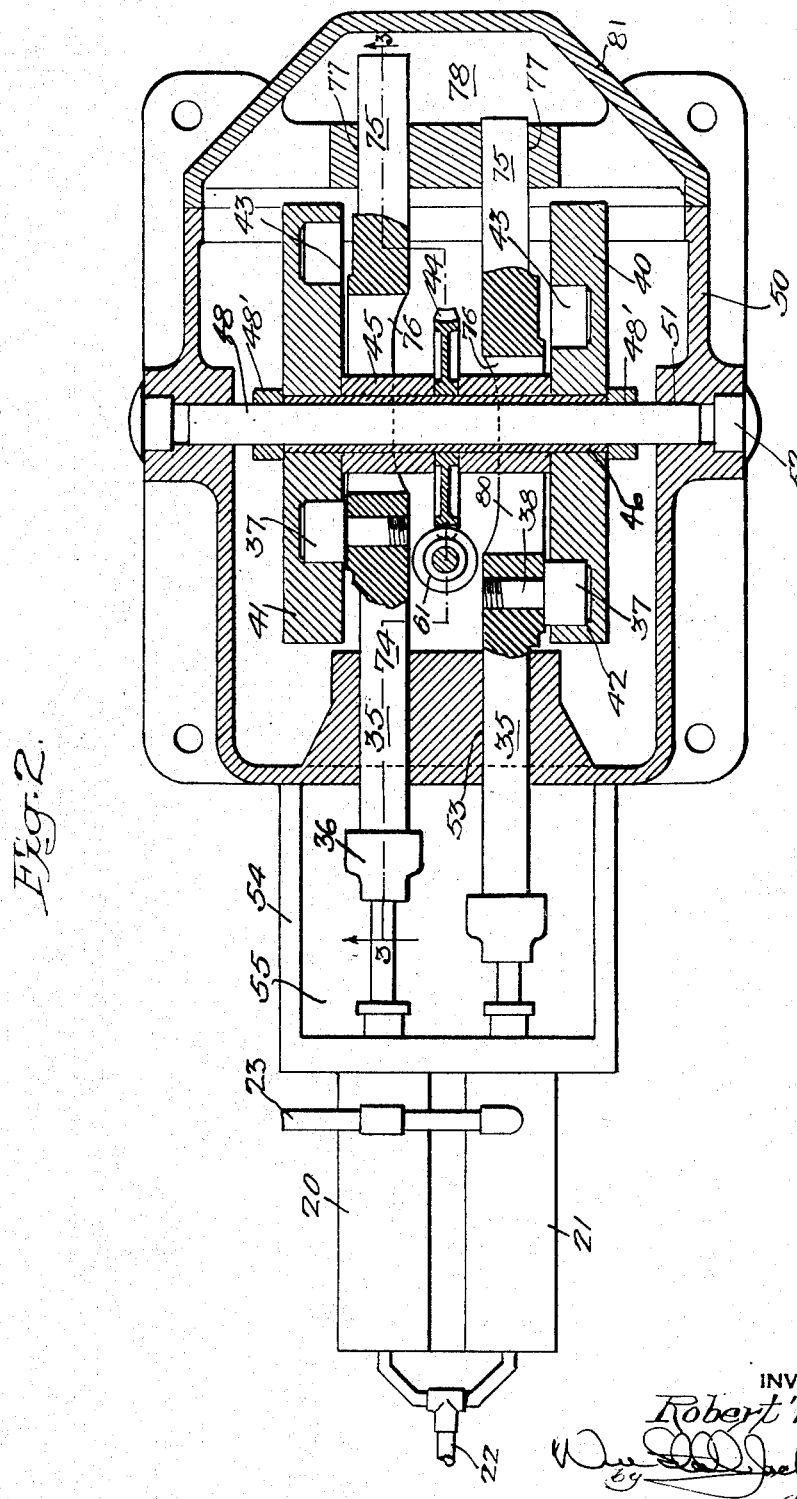
Figure 2 is a sectional plan of a constant delivery pump which may be employed in the invention, the section being taken on the line 2—2 of Figure 3.
Figure 3:
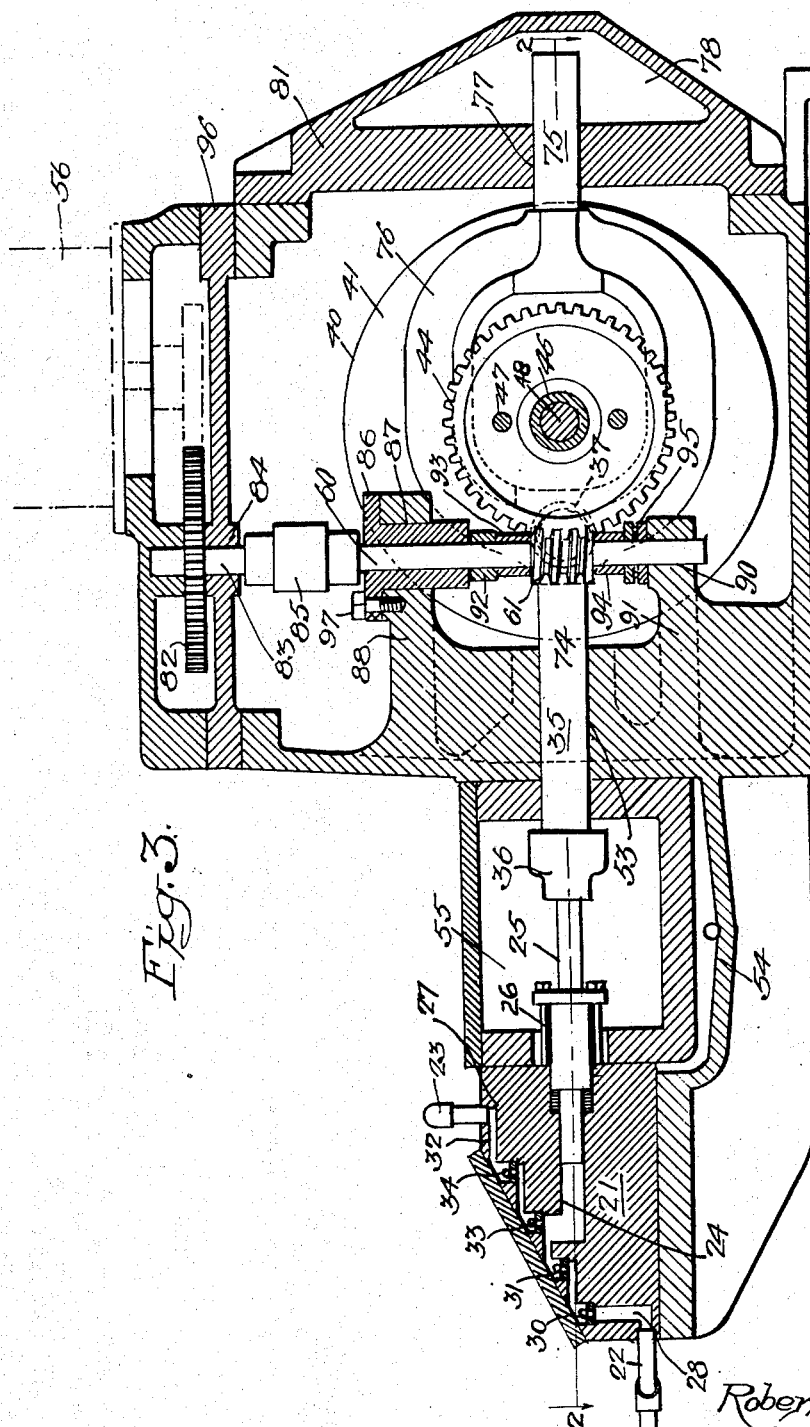
Figure 3 is a sectional elevation of the constant delivery pump of Figure 2, the section being taken on the line 3—3 of Figure 2.

The pump may be of any suitable metering pump design, but will preferably be a constant delivery pump, of which a preferred embodiment is shown in Sheen, Welker, Saalfrank, U. S. patent application Serial No. 53,232, filed October 7, 1948, for Constant Delivery Pump. The preferred device of this patent application is described herein, referring to Figures 2 and 3.

The constant delivery pump 12 comprises two pumps 20 and 21 having common inlet from the pipe 11 at 22 and common outlet to the pressure reducing valve 13 at 23.

Each pump itself may desirably be of the character described in Milton Roy Sheen, U. S. Patents No. 2,263,429 for Pump, granted November 18, 1941, or No. 2,367,893 for Liquid Pump, granted January 23, 1945. The cylinder 24 receives a plunger or piston 25 surrounded by a packing gland 26. The cylinder block 27 has suitable valve passages. Inlet is through a passage 28 which leads through two inlet valves 30 and 31 in series and preferably of ball type. Discharge is through a passage 32 in which are located in series two valves 33 and 34, preferably of ball type.

The plungers are suitably connected by nuts 36 to plunger extensions 35 which are suitably guided in the pump housing. The extensions 35 carry followers 37, preferably rollers, rotating on pins secured to the sides of the extensions in the plane of the center lines of the plungers.

A cam unit 40 on an axis in the plane of the center lines of the plungers and transverse to the plungers comprises opposite cams 41 and 42 having cam tracks 43 facing one another and engaging the followers. The cams are set out of phase with respect to one another, and where there are two pumps the cams are preferably approximately 180° out of phase. Desirably the pumping stroke of each pump is slightly longer than 180°, so that for a portion of the cycle both pumps are on the pumping stroke and to maintain constant delivery the cams compensate so that the delivery at this portion of the stroke is the same as the delivery at all other portions of the stroke.

Rigidly secured to the cams on the same axis is a worm wheel 44, which is spaced from the cams on either side by spacers 45. A bushing 46 passes through the spacers and through the worm wheel. Bolts 47 extend clear through from one cam to the other and unite together the cams, worm wheel and spacers.

A preferably stationary shaft 48 positioned on opposite sides of a housing 50 is secured in the housing at 51. Collars 49' center the cam unit on the shaft. The opening at 51 may be closed by a plug 52. The plunger extensions are guided in the housing at 53.

Walls 54 from the housing surround a well 55 which will preferably contain a sealing liquid which minimizes the escape of chlorine gas by leakage at the packing gland. The sealing liquid may be a silicone oil of the character which is available commercially for lubrication or sealing purposes, or may be a water solution of calcium hypochlorite or some other hypochlorite. In case it is desired to avoid all possibility of chlorine escape, the sealing liquid may be a water solution of an alkali such as sodium or potassium hydroxide.

The drive of the pump will desirably be by an electric motor 56 which is actuated by the controller 18. Where the electric motor 56 is not of a variable speed type, a speed changer 57, suitably of mechanical or electrical character, may be interposed between the motor and the pump as shown in Figure 1.

The drive of the pump is desirably accomplished through a shaft 60 which drives a worm 61 engaging the worm wheel 44.

The plunger extensions 35 desirably have bearing portions 74 and 75 and an intermediate yoke portion 76. The bearing portions 75 are guided at 77 in the housing and the bearing portions 74 are guided at 53 in the housing. The ends of the bearing portions 75 extend into a well 78 in the housing.

The yokes have internal openings 80 which surround the spacers 45 of the cam units. The end 81 of the housing is removable so that the cam unit and yokes can be inserted in an entirety. The drive from the motor and variable speed device is accomplished through a gear 82 to a suitable shaft 83 mounted in a bearing 84 at the top of the housing. The stub shaft 83 extends to a dog type clutch 85 which connects to the shaft 60. A flanged bushing 86 is mounted in a socket 87 on an arm 88 from the housing. The opposite end of the shaft rotates in an opening 90 in an arm 91 of the housing. Spacers 92, 93 and 94 are provided around the shaft 60 on opposite sides of the worm and the thrust on the shaft is taken up by a thrust bearing 95. The shaft and its associated parts can be removed bodily by removing a machine screw 97, after taking off the top 96 of the housing.

The constant delivery pump has the great advantage that whenever there is a demand for chlorine it feeds the chlorine uniformly to the material receiving the chlorine. Where the chlorine controller 18 calls for chlorine continuously, the delivery of the constant delivery pump can be regulated automatically by the controller to establish the motor speed at the desired level. It will be evident that by the invention very small quantities of chlorine can be accordingly delivered. Thus it is possible to feed chlorine at a rate of one pound per day or less in accordance with the invention.

Figure 4:
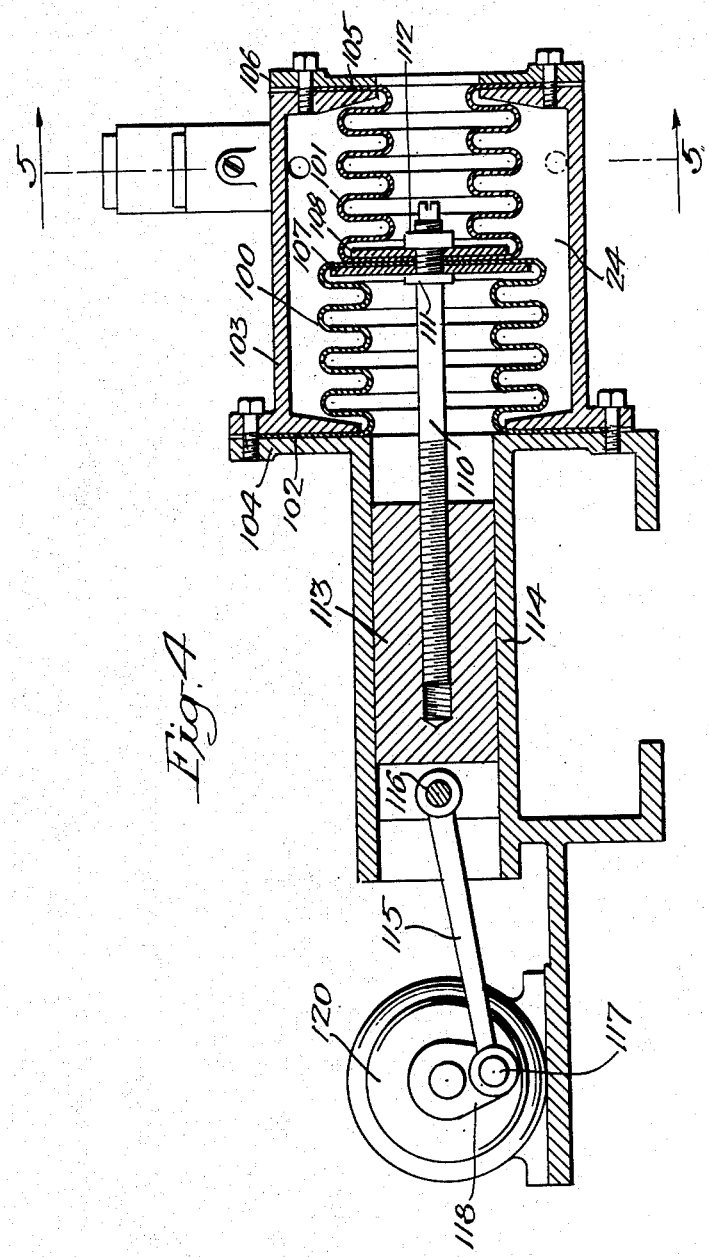
Figures 4 and 5 illustrate a variation in the pump which may be employed in accordance with the invention.
Figure 5:
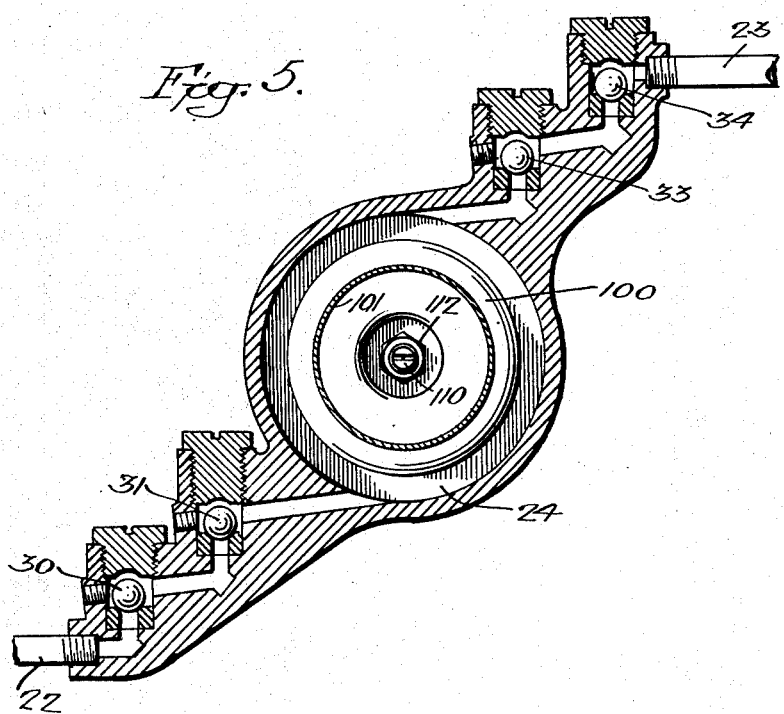

Figures 4 and 5 illustrate an alternate pump construction which may be used, the pump itself conforming with Royal Bartlett Saalfrank U. S. patent application Ser. No. 53,953, filed October 11, 1948, for Bellows Pump, now Patent No. 2,578,265, October 11, 1948. The pump of Figures 4 and 5 may either be employed as a single pump used by itself, or may be used in duplicate to make a constant delivery pump in accordance with Figures 2 and 3.

As best seen in Figure 4, the pump cylinder 24 contains two opposed bellows 100 and 101 having different displacement characteristics per unit of reciprocation and suitably coaxial as shown. In the preferred embodiment the bellows 100 having the larger displacement characteristics is larger in diameter and the bellows 101 having the smaller displacement characteristics is smaller in diameter. The bellows may be made of suitably fatigue resisting flexible metal resistant to liquid chlorine, of which a chrome, nickel, molybdenum stainless steel such as type 347 of the American Iron and Steel Institute is a suitable example. The larger bellows 100 has its base flange 102 anchored between one end of the pump casing 103 and one head 104 of the pump chamber, and the smaller bellows 101 has its base flange 105 anchored between the opposite end of the casing 103 and the opposite head 106. The bellows in the form shown have their moving ends provided with rigid heads 107 and 108 suitably united as by welding to the flexible bellows walls, and having an axial opening through which passes a reciprocating operator 110 which has a shoulder 111 on one side of the head 107 and a clamping nut 112 threaded on the operator which is on the opposite side of the head 108 and clamps together the moving ends of the two bellows.

As best seen in Figure 5 the chamber has on the inlet side two check valves 30 and 31, suitably of ball type, arranged in series, and likewise on the outlet side there are two check valves 33 and 34, preferably of ball type, arranged in series. For many purposes the balls of the check valve may be made of chromium, nickel, molybdenum stainless steel such as type 347 above referred to. Balls of fused aluminum oxide are however very desirable, as they are not only resistant to liquid chlorine, but give very accurate closure upon seating, due to the fact that they can readily be obtained in a very high degree of spherosity (spherosity limits within 25 millionths of an inch are readily obtainable). A very satisfactory available form of aluminum oxide for these balls is the mineral sapphire. Instead of sapphire other forms of fused aluminum oxide such as ruby and corundum may also be employed.

The operator 110 can be reciprocated in any suitable way, as for example by a crosshead 113 in which it is adjustably mounted, reciprocated in crosshead guides 114 by a connecting rod 115 pivotally connected at 116 to the crosshead and pivotally connecting at 117 at its opposite end to a crank 118 driven by a suitable electric motor 120.

It will be understood that in the motion of the operator 110 to the right in Figure 4, the larger differential bellows will cause displacement more rapidly than the smaller differential bellows creates suction, and therefore the discharge stroke will occur. On the motion of the operator 110 to the left the reverse condition will prevail and the suction stroke will result.

It will be understood that the pump of Figures 4 and 5 will be replaced in the structure of Figure 1 at the same point that the metering pump 12 is there located.

In view of my invention and disclosure variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claims.

Having thus described my invention what I claim as new and desire to secure by Letters Patent is:

1. The process of feeding chlorine, using a positive displacement metering pump, which comprises feeding chlorine as a liquid under pressure above the vapor pressure of the chlorine at the particular temperature through the positive displacement metering pump, thus gaining the advantage of increased accuracy of feeding as a liquid rather than feeding as a gas, then reducing the pressure of the metered liquid chlorine below the vapor pressure of the chlorine at the particular temperature and dispensing the chlorine into a medium to be treated as a gas at a pressure below the vapor pressure of the chlorine at the particular temperature.

2. The process of feeding chlorine, using a positive displacement metering pump, which comprises sensing the chlorine demand of a medium to which chlorine is to be added, feeding chlorine as a liquid under pressure above the vapor pressure of chlorine at the particular temperature through the positive displacement metering pump at a rate controlled by the chlorine demand sensed, thus gaining the advantage of increased accuracy of feeding liquid chlorine as compared with feeding chlorine as a gas, then reducing the pressure of the metered liquid chlorine below the vapor pressure of the chlorine at the particular temperature to convert the chlorine to a gas, and dispensing the chlorine into the medium to which the chlorine is to be added as a gas.

3. In a feed for liquid chlorine, a sensing element continuously sensing chlorine demand in a medium to which chlorine is being added, a controller connected to the sensing element and operative when the sensing element indicates chlorine demand, a chlorine cylinder, a positive displacement metering pump having its intake connected to the cylinder at a point below the liquid chlorine level therein and operatively connected to the controller so that the pump will function when chlorine demand exists, a pressure reducing valve connected to the discharge side of the pump and adapted to convert liquid chlorine into chlorine gas and a dispenser connected to the pressure reducing valve and located at the point at which chlorine is to be added to the medium, whereby the advantage of increased accuracy of feeding liquid chlorine is obtained, but the chlorine is added to the medium as a gas.

References Cited in the file of this patent

UNITED STATES PATENTS

| Number | Name | Date |
|---|---|---|
| 1,497,326 | Van Keulen | June 10, 1924 |
| 1,587,830 | Heine | June 8, 1926 |
| 1,609,756 | MacMahon | Dec. 7, 1926 |
| 2,049,239 | Wilcox | July 28, 1936 |
| 2,289,589 | Pomeroy | July 14, 1942 |
| 2,362,984 | Boshkoff | Nov. 21, 1944 |
| 2,387,894 | Fannin | Oct. 30, 1945 |
| 2,402,355 | Whaley, Jr. | June 18, 1946 |
| 2,408,221 | Michel | Sept. 24, 1946 |
| 2,453,766 | Thayer | Nov. 16, 1948 |
| 2,482,078 | Wallace | Sept. 13, 1949 |